A. SUNDH.
MEANS FOR CONTROLLING VARIABLE MECHANISM.
APPLICATION FILED MAR. 11, 1909.
1,134,771.
Patented Apr. 6, 1915.
2 SHEETS—SHEET 1.
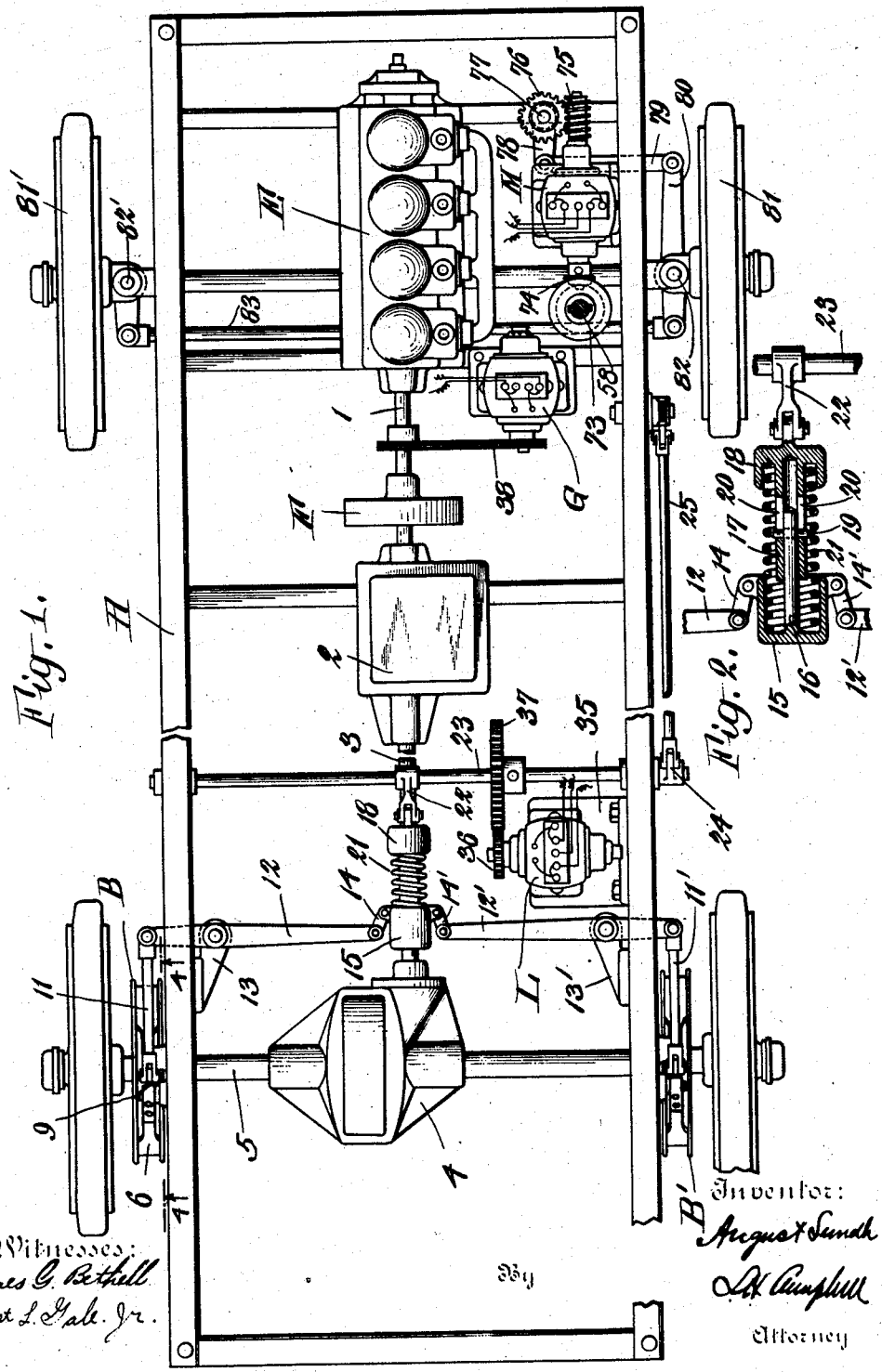

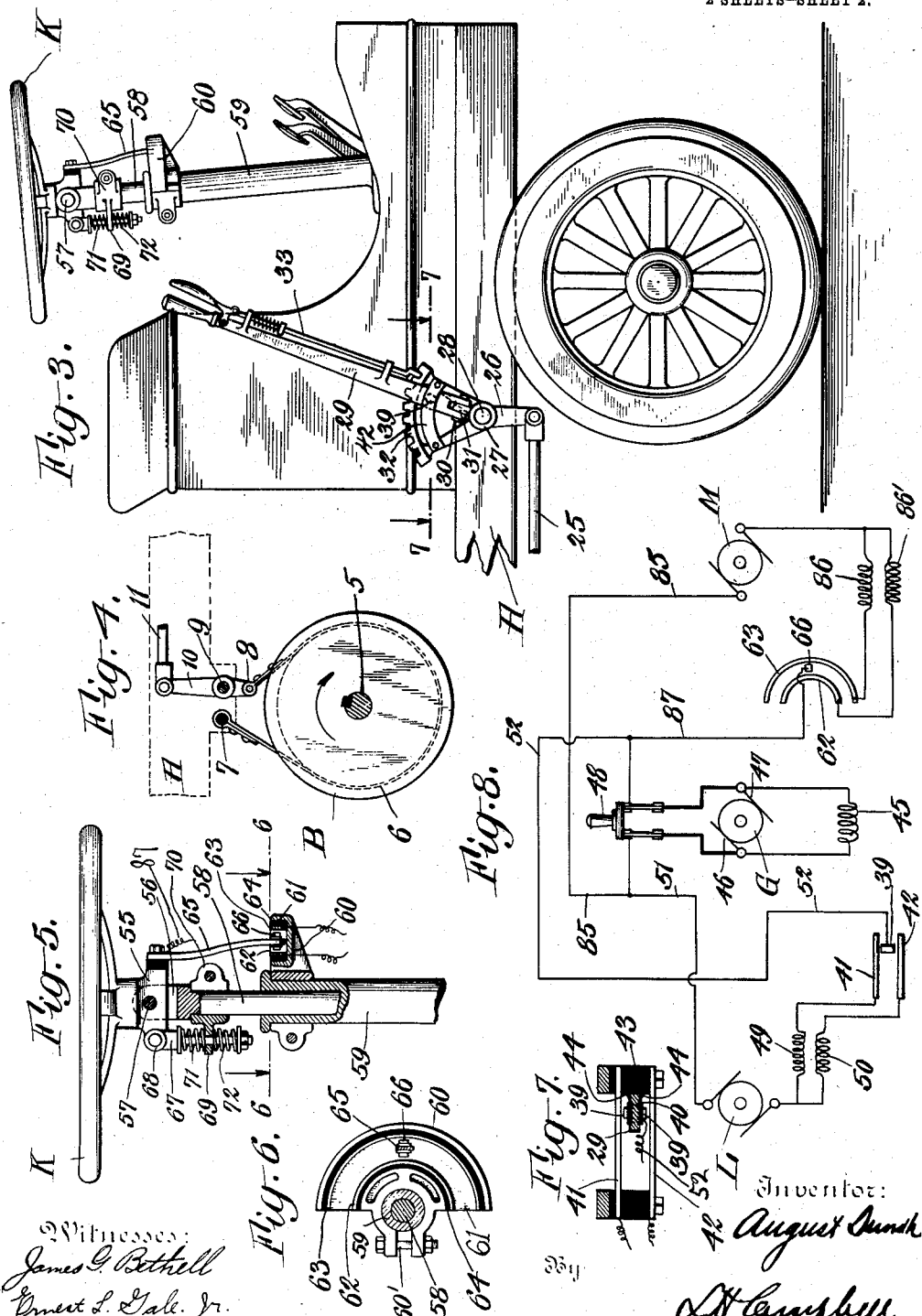

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

MEANS FOR CONTROLLING VARIABLE MECHANISM.

1,134,771.        Specification of Letters Patent.      Patented Apr. 6, 1915.

Application filed March 11, 1909. Serial No. 482,673.

*To all whom it may concern:*

Be it known that I, AUGUST SUNDH, a citizen of the United States, residing at Yonkers, in the county of Westchester and State of New York, have invented a new and useful Improvement in Means for Controlling Variable Mechanism, of which the following is a specification.

The present invention relates to means for operating various forms of mechanism either manually or by power supplied from any suitable source.

The invention is adapted for use with a wide variety of mechanisms which are ordinarily operated, or may be operated manually, and which may also be operated by an electrical motor or a hydraulic motor, or other source of power. For example, the invention may be used with steering mechanism for automobiles or other vehicles, boats, etc.; brake mechanism for road vehicles, hoisting apparatus, etc.; for controlling apparatus for elevators, and with various other mechanisms.

One of the objects of the invention is to provide in combination with mechanism to be operated, an electric motor or other source of power for operating said mechanism, a manually operable device which is adapted to control the power for operating said mechanism, and which also has mechanical connections with said mechanism for operating the latter by manual power applied to said device. With an arrangement of this kind, manual power is not ordinarily required for operating the mechanism, but may be applied at any moment in case the power device fails to operate. This is of special importance as applied to safety devices and controlling mechanism; as for example, brake mechanism for an automobile or safety devices for an elevator in which it is essential that the operator should be able to operate the safety devices immediately by manual power if the normal source of power should unexpectedly fail; in such case with the present invention, the operator may control and apply the safety devices by the same controlling lever or operating device when the usual source of power fails, and by the same movement of the controlling lever as when the safety mechanism is operated by power.

Other objects of the invention will appear hereinafter in connection with the detailed description of the drawings.

The novel combinations of elements are set forth in the appended claims.

In the accompanying drawings, which illustrate certain forms of my invention as adapted for use in controlling an automobile, Figure 1 is a plan view of an automobile truck with my invention applied thereto; Fig. 2 is a detail sectional view of an elastic connection between the brakes and brake operating mechanism; Fig. 3 is a fragmentory side elevation of the front end of the automobile showing the steering and brake applying mechanism; Fig. 4 is a detail view taken on the line 4—4 of Fig. 1, and showing a brake strap; Fig. 5 is a detail view of the steering wheel, and an electrical controlling switch associated therewith; Fig. 6 is a section on the line 6—6 of Fig. 5; Fig. 7 is a detail sectional view taken on the line 7—7 of Fig. 3; Fig. 8 is a diagrammatical view of the generator and electrical circuits therefor.

Referring to Fig. 1, the frame A of an automobile truck carries a prime mover E which is preferably a gasolene engine or other form of internal combustion engine. The shaft 1 of the engine is connected to any suitable form of speed gear located within the casing 2 and adapted to transmit power to the shaft 3 extending rearwardly to the casing 4 in which may be located the usual form of differential gearing connected to drive the rear axle 5 of the machinery. A fly wheel F may be mounted on the engine shaft 1. The particular form of mechanism for transmitting power from the prime mover to the driving axle is not *per se* a part of the present invention, and may be varied as desired. For example, a pump may be connected to be driven by the engine and supply fluid under pressure to operate a fluid motor geared to the driving axle. Various other forms of power transmitting mechanism might also be employed.

The brake mechanism as shown in Figs. 1 and 4 comprises brake pulleys B and B' keyed to the driving axle 5. Coöperating with each brake pulley is a brake strap 6 pivoted at 7 to the frame A and extending around the brake pulley; the opposite end of the brake strap is connected at 8 to a lever 10 having a pivot 9. Connected to the upper ends of the levers 10 are links 11 and 11' extending forward from said levers and pivoted at their front ends to levers 12 and 12' respectively; the latter are pivoted to brackets 13 and 13' secured to the frame A. The inner ends of the levers 12 and 12' are connected by short links 14 and 14' to a cup shaped member 15; the latter is provided with a stem or rod 16 which telescopes with a sleeve 17 formed integral with a cup shaped member 18. A pin 19 extending through the stem 16 and through slots 20 formed in the sleeve 17 serves to limit the relative longitudinal movement of the members 15 and 18; these members are normally held in their extended position by a coil spring 21 surrounding the telescope and extending into the cup shaped members. The member 18 is pivoted to a crank arm 22 secured to a shaft 23 extending across the machine and journaled in the frame A. On one end of the shaft 23 is another crank arm 24 having a pivotal connection with a forwardly extending rod 25. The forward end of the rod 25 is pivotally connected to an arm 26 formed on a sleeve 27 rotatable on a pin 28 secured to the frame of the machine.

A manually operable brake lever 29 is pivoted by means of a pin 30 to a lug or arm 31 extending from the sleeve 27. As the pivoted pin 30 extends at right angles to the pin 28, any forward or rearward movement of the brake lever 29 will rotate the sleeve 27 and the crank arm 26. The connection at 30 permits a lateral movement of the lever 29 in either direction independently of the sleeve 27. A toothed quadrant 32 secured to the frame and coöperating latch 33 of well known construction serve to hold the brake lever 29 in any position to which it may be moved in a forward or rearward direction.

To manually operate the brakes, the lever 29 is moved in a forward direction; this moves the rod 25 rearwardly and rotates the shaft 23 and through the crank arm 22 carried thereby, moves the member 18 rearwardly. The pressure on the member 18 is transmitted through a coil spring 21 to the member 15; the latter operates the levers 12 and 12' to pull the links 11 and 11' forward, thereby rotating the levers 10 and applying the brake straps 6 to the brake pulleys.

The elastic connection as shown in Fig. 2 permits the brakes to be applied with a yielding pressure which is more effective than the pressure which would be secured without an elastic connection and also prevents vibration and jerkiness of the manual lever 29, which would otherwise occur when brake mechanism is applied while the machine is going over rough roads. When the hand lever 29 is moved far enough forward, the spring 21 is compressed until the pin 19 engages the forward ends of the slots 20, after which power applied to the lever 29 would be positively transmitted to the brakes.

The mechanism for operating the brakes by power supplied from the prime mover E will now be described. As shown in Fig. 1, a small electric motor L is mounted on a bracket 35 bolted to the frame of the machine. The shaft of the motor carries a pinion 36 meshing with the gear wheel 37 keyed to the shaft 23. It will thus be seen that when the motor armature is rotated the motion is transmitted to the shaft 23 and serves to operate the brake mechanism the same as when said shaft is rotated by means of the manual lever 29. An electric current to operate the motor L is supplied from a small generator G which may be connected in any convenient way to be operated by the prime mover E. As here shown, a sprocket chain or belt 38 forms a driving connection from the engine shaft to the generator shaft. The engine E is adapted to run continuously at a substantially constant speed; the speed of the machine being controlled by the speed gear in the casing 2 or by other power transmitting mechanism permitting the speed to be varied or the engine to be disconnected from the driving axle. The generator G will therefore always run at a substantially constant speed so that the potential will be sufficient to supply current to operate the motor L whenever desired.

Circuits for the motor L are controlled by the manual lever 29. As shown in Figs. 3 and 7, the lever 29 carries a contact pin or block 39 extending through the lever but insulated therefrom by a bushing 40 of insulating material. The pin 39 is located between two arc shaped metal strips 41 and 42 concentric with the pin 28. These strips are electrically insulated from each other by the insulating material 43. Leaf springs 44 serve to normally hold the lever 29 midway between the contact strips 41 and 42 and with the contact 39 separated from said strips. By a slight lateral pressure on the lever 29, the contact 39 may be brought into engagement with either the strip 41 or the strip 42 and held in contact therewith during the forward or rearward movement of the lever. A conductor 52 is connected to the contact 39, and as shown in Fig. 8, has electrical connection with the generator G.

Fig. 8 is a diagrammatical view showing the generator, motors and controlling apparatus. As here shown, the generator G is a shunt wound machine having a field coil 45 connected across the commutator brushes 46 and 47. A switch 48 may be provided for disconnecting the generator from the motors. The motor L is shown as a series wound motor having two oppositely wound field coils 49 and 50.

The normal operation of the brake mechanism will be understood from the following description: When the operator desires to apply the brakes, he grasps the hand lever 29 to release the catch 33, and then moves the lever outwardly to bring the contact 39 against the contact strip 42; this establishes a circuit from the generator through the motor L, which may be traced from the brush 46, through the switch 48, wire 51, through the armature of the motor L, through the field coil 50, contacts 42 and 39, conductor 52 and switch 48, to the other brush 47 of the generator. The motor L therefore receives current and rotates in a direction to apply the brakes, at the same time transmitting movement through the rod 25 and to the hand lever 29 to move the same forward. The only power therefore necessary to apply the brakes is that required to hold the hand lever in position to keep the sliding switch contacts in engagement. When the brakes have been thus applied, the latch 33 will serve to hold them in applied position if desired, the springs 44 operating to automatically open the motor circuit.

As the engine E is running continuously at a practically constant speed, the power for operating the brake mechanism is always available, even when the machine is running at a slow speed or when the power is disconnected from the driving mechanism, as for example, going down a hill, in which case the brake mechanism may be used to regulate and control the speed of the machine. If at any time the motor L should fail to operate properly or supply the necessary power to operate the brakes, the latter may readily be operated manually by applying sufficient forward pressure to the brake lever 29. As this manual operation is effected through the same lever and by the same movement of the lever as that which controls the operation by the motor, it will be seen that in case of failure of the latter to operate, the brake may be immediately applied without the use of additional mechanism or special devices. The brake apparatus is therefore at all times under the full control of the operator, which is of great practical importance, especially in cases of emergency where quick action is necessary, and the operator has no time and may lack presence of mind to operate special devices as would otherwise be necessary in case the power should fail at a critical moment.

To release the brake mechanism, the lever 29 is moved inward to engage the contact 39 with the contact strip 41; this completes a circuit through the other winding 49 of the motor L, thereby reversing the motor field and causing the motor to operate in the reverse direction, and thus releasing the brakes.

The steering mechanism will now be described. The steering wheel K is formed with a vertical web 55 located in a slot 56 in the upper end of the steering shaft 58. A horizontal pivoted pin 57 extending through the web 55 connects the steering wheel with the shaft 58, permitting said wheel to tilt about a horizontal axis; this construction prevents any rotary movement of the steering wheel independently of the shaft 58; the latter is journaled in a vertically disposed standard 59. Secured to the standard 59 by means of a clamping bolt 60' is a bracket 60 formed with a horizontal arc shaped recess 61, in which are located arc shaped metal contact strips 62 and 63 concentric with the shaft 58. These contact strips are electrically separated from each other and from the bracket 60 by insulating material 64. An arm 65 of conducting material is bolted to but electrically insulated from the steering wheel K; the lower end of this arm carries a contact 66 which extends into the recess 61 between the contact strips 62 and 63. The contact 66 is normally held midway between the strips 62 and 63 by means of a centering device comprising a rod 67 pivoted at 68 to the steering wheel K and extending downwardly through a web 69 formed on a bracket 70 bolted to the steering wheel shaft 58. Upper and lower coil springs 71 and 72 located above and below the web 69 respectively operate to hold the steering wheel K normally in a plane at right angles to the shaft 58. A moderate pressure on the rear side of the steering wheel will tilt it about its pivot 57, compressing the spring 71 and moving the contact 66 into engagement with the strip 63. When this pressure is released the spring 71 will bring the parts back to normal position. When the steering wheel is tilted forward the contact 66 engages the strip 62. The contact 66 is electrically connected through the arm 65 and conductor 87 to the brush 47 of the generator G as shown diagrammatically in Fig. 8.

Keyed to the shaft 58 is a beveled gear wheel 73 (Fig. 1) which meshes with a beveled pinion 74 keyed to the armature shaft of a small electric motor M. This motor may be similar in construction to the motor L. The front end of the motor shaft carries a worm 75 meshing with a worm wheel 76 secured to a vertical shaft 77; the shaft 77 has secured thereto a crank arm 78 connected by a link 79 to the forward end of a lever 80; the latter is connected for movement with the front wheel 81 about a vertical bolt 82 as an axis. The rear end of the lever 80 is connected to a rod 83 extending across the machine to operate the wheel 81' about a bolt 82' as an axis. These connections secure parallel movement of the front wheels in steering the machine.

The operation of the steering mechanism is as follows: To turn the machine in a right hand direction, for example, the operator tilts the steering wheel K to bring the contact 66 into engagement with the contact strip 63; this establishes a circuit from the generator G through the motor M; this circuit may be traced from the brush 46, through the switch 48, conductor 85, through the armature of the motor M, field coil 86 of the motor M, contact strip 63, contact 66, conductor 87 and to the opposite brush 47. The motor M therefore receives current and operates through the worm gear mechanism, link 79, etc., to turn the front wheels in the right hand direction about their vertical axes; this movement of the motor is also transmitted through beveled gears 74 and 73, and thereby rotates the steering wheel K in the right hand direction. When the wheels have been turned as far as desired, the operator permits the steering wheel to move about its horizontal axis to disengage the contacts 63 and 66 thereby opening the motor circuit and stopping the motor. To return the front wheels to central position, the steering wheel is tilted forward to connect the contacts 66 and 62; this establishes a circuit through the oppositely wound field coil 86', thereby reversing the motor fields and causing the motor to run in the opposite direction. It will thus be seen that the only power required to operate the steering mechanism is that necessary to tilt the steering wheel about its horizontal axis. It will also be apparent that the steering operation may be accomplished manually by simply rotating the steering wheel about its vertical axis. The steering mechanism may therefore be operated at any time even if the motive power should fail. The principle of operation is very similar to that of the brake mechanism, and also has similar advantages.

An important feature of the present invention consists in the arrangement by which manual power may be positively applied to operate the steering mechanism by rotating the wheel K, there being a positive driving connection without any lost motion between the steering wheel and the front wheels of the machine.

Although I have shown my invention as applied to mechanism for controlling an automobile truck, some of the principles thereof are applicable to various other forms of mechanism as already indicated.

Although electric motors are herein shown as the means for supplying power for operating the mechanism, hydraulic motors or other forms of motors might be employed for this purpose.

Various changes in the details of construction and arrangements of parts might also be made without departing from the spirit and scope of the invention, and I wish therefore, not to be limited to the particular construction herein disclosed.

What I claim as new and desire to secure by Letters Patent of the United States is:—

1. The combination with a power transmission mechanism, of a motor connected to operate said mechanism, a lever movable about horizontal and vertical axes, connections between the motor and lever for moving the lever about its vertical axis whenever the motor is operated, and means controlled by the tilting of the lever about its horizontal axis for operating the motor.

2. The combination with a power transmission mechanism, of a motor connected to operate said mechanism, a lever movable about horizontal and vertical axes, connections between the motor and lever for moving the lever about its vertical axis whenever the motor is operated, means controlled by the tilting of the lever about its horizontal axis for operating the motor, and means for normally maintaining said lever in a predetermined position with respect to its horizontal axis.

3. The combination with a power transmission mechanism, of a motor connected to operate said mechanism, a lever movable about horizontal and vertical axes, connections between the motor and lever for moving the lever about its vertical axis whenever the motor is operated, means controlled by the tilting of the lever about its horizontal axis for operating the motor, and a spring centering device adapted to maintain said lever in a predetermined position on its horizontal axis.

4. The combination with a power transmission mechanism, of an electric motor arranged to drive said mechanism, a wheel or lever movable about substantially horizontal and vertical axes, connections between the motor and lever for moving the lever about its vertical axis whenever the motor is operated, and means controlled by the tilting of the lever about its horizontal axis for closing a circuit to said electric motor.

5. The combination with a power transmission mechanism, of an electric motor arranged to drive said mechanism, a wheel or lever movable about substantially horizontal and vertical axes, connections between the motor and lever for moving the lever about its vertical axis whenever the motor is operated, and a switch controlled by the tilting of the lever about its horizontal axis for controlling a circuit to said electric motor.

6. The combination with a power transmission mechanism, of an electric motor arranged to drive said mechanism, a lever movable about substantially horizontal and vertical axes, connections between the motor and lever for moving the lever about its vertical axis whenever the motor is operated, a switch associated with the said lever and adapted to start, stop and reverse the motor upon moving said lever about its horizontal axis, and means comprising a centering device for normally maintaining said switch in open position.

In testimony whereof, I have signed my name to this specification in the presence of two subscribing witnesses.

AUGUST SUNDH.

Witnesses:
CHARLES W. BOOTA,
FRIEDA H. WESEMANN.